US008626588B2

(12) United States Patent  
Rajaram

(10) Patent No.: US 8,626,588 B2  
(45) Date of Patent: Jan. 7, 2014

(54) ADVERTISING WITH AUDIO CONTENT

(75) Inventor: Gokul Rajaram, Los Altos, CA (US)

(73) Assignee: Google Inc., Mountain View, CA (US)

( * ) Notice: Subject to any disclaimer, the term of this patent is extended or adjusted under 35 U.S.C. 154(b) by 2415 days.

(21) Appl. No.: 11/241,858

(22) Filed: Sep. 30, 2005

(65) Prior Publication Data

US 2007/0078709 A1    Apr. 5, 2007

(51) Int. Cl.  
*G06Q 30/00* (2012.01)

(52) U.S. Cl.  
USPC .................................................. 705/14.69

(58) Field of Classification Search  
USPC ................... 705/10, 14, 26; 725/38; 235/376  
See application file for complete search history.

(56) References Cited

U.S. PATENT DOCUMENTS

| | | | |
|---|---|---|---|
| 7,364,068 B1 * | 4/2008 | Strubbe et al. ................ | 235/376 |
| 2002/0095330 A1 | 7/2002 | Berkowitz | |
| 2003/0093790 A1 * | 5/2003 | Logan et al. .................... | 725/38 |
| 2004/0133469 A1 | 7/2004 | Chang | |
| 2004/0148638 A1 | 7/2004 | Weisman | |
| 2005/0086106 A1 | 4/2005 | Takiyama | |
| 2005/0149407 A1 | 7/2005 | Kamiwada et al. | |

FOREIGN PATENT DOCUMENTS

| | | |
|---|---|---|
| JP | 2005-128638 | 5/2005 |
| WO | WO 2004/057558 | 7/2004 |

OTHER PUBLICATIONS

PCT/ISA/220, "Notification of Transmittal of the International Search Report and the Written Opinion of the International Searching Authority, or the Declaration" for PCT/US06/38204 mailed Aug. 20, 2007 (1 pg.).

PCT/ISA/210, "International Search Report" for PCT/US06/38204, mailed Aug. 20, 2007 (3 pgs.).  
PCT/ISA/237, "Written Opinion of the International Searching Authority" for PCT/US06/38204, mailed Aug. 20, 2007 (6 pgs.).  
http://www.blinkx.com/ (1 pg.; downloaded May 1, 2008).  
http://www.everyzing.com/ (3 pgs.; downloaded May 1, 2008).  
http://www.insideonlinevideo.com/2007/06/22/blinkx-to-contextualize-video-ads-through-speech-recognition/ (2 pgs.; downloaded May 1, 2008).  
http://www.scanscout.com/ (1 pg.; downloaded May 1, 2008).

(Continued)

*Primary Examiner* — Saba Dagnew  
(74) *Attorney, Agent, or Firm* — John C. Pokotylo; Straub & Pokotylo

(57) ABSTRACT

The serving of advertisements with (e.g., on) audio documents may be improved in a number of ways. For example, a system may (a) accept information defining at least one ad spot associated with at least one instance of an audio document, (b) accept offers to have advertisements served in the ad spot(s), and (c) arbitrate among competing advertisements, using at least the offers, to determine at least one advertisement to be served in that ad spot(s). As another example, a system may (a) accept relevance information for an advertisement, (b) determine at least one audio document using the accepted relevance information, (c) present information about the audio document(s) to an advertiser associated with the advertisement, and (d) accept, from the advertiser, an offer to have its advertisement served with at least one of the audio document(s) accepted. As yet another example, a system may (a) accept relevance information for an audio document, (b) determine a plurality of advertisements relevant to the audio document using the relevance information and serving constraints of the advertisements, and (c) select at least one of the determined relevant advertisements to be served with the audio document. Examples of documents include radio programs, live or recorded musical works with lyrics, live or recorded dramatic works with dialog or a monolog, live or recorded talk shows, voice mail, segments of an audio conversation, etc.

34 Claims, 7 Drawing Sheets

(56) References Cited

OTHER PUBLICATIONS

Examiner's First Report on Australian Patent Application No. 2006297131, dated Aug. 27, 2009 (3 pgs.).
Notice of Preliminary Rejection for Korean Patent Application No. 10-2008-7010544, mailed Feb. 26, 2010 (7 pgs.) with translation (8 pgs.).
First Examination Report for Indian Patent Application No. 863/MUMNP/2008, mailed Mar. 21, 2012 (2 pgs.).
Notice of Preliminary Rejection for Korean Patent Application No. 10-2008-7010544, mailed Oct. 17, 2012 (3 pgs.) with (3 pgs.).
Notification of the First Office Action for Chinese Patent Application No. 200680044721.6, mailed Dec. 16, 2010 (4 pgs.) with translation (7 pgs.).
Notice of Final Rejection for Korean Patent Application No. 10-2008-7010544, mailed Dec. 29, 2010 (3 pgs.) with translation (2 pgs.).
Supplementary European Search Report for European Patent Application No. 06815879.9-1238, mailed Mar. 18, 2011 (6 pgs.).
Translation of Notice of Reasons for Rejection for Japanese Patent Application No. 2008-533705, mailed Apr. 5, 2011 (4 pgs.).
Examiner's Report for Canadian Patent Application No. 2,624,545, mailed Jul. 4, 2013 (4 pgs.).
Notice of Preliminary Rejection for Korean Patent Application No. 10-2008-7010544, mailed Aug. 16, 2013 (3 pgs.) with English translation (3 pgs.).
Demand for Agreement for Korean Patent Application No. 10-2011-7009731, mailed Oct. 7, 2011 (2 pgs.) with translation (1 pg.).
Notice of Preliminary Rejection for Korean Patent Application No. 10-2011-7009731, mailed Oct. 7, 2011 (2 pgs.) with translation (3 pgs.).
Decision on Rejection for Chinese Patent Application No. 200680044721.6, mailed Oct. 26, 2011 (5 pgs.) with translation (4 pgs.).
FIrst Office Action for European Patent Application No. 06 815 879.9, mailed Jan. 20, 2012 (7 pgs.).
Examiner's Report for Canadian Patent Application No. 2,624,545, mailed Feb. 20, 2012 (3 pgs.).

\* cited by examiner

500

600

700

ADVERTISING WITH AUDIO CONTENT

§1. BACKGROUND OF THE INVENTION

§1. Field of the Invention

The present invention concerns advertising, such as online advertising for example. In particular, the present invention concerns improving the utility of advertisements, such as cost per impression advertisements for example, to end users.

§2. Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.). Query keyword targeting has been used by search engines to deliver relevant ads. For example, the AdWords advertising system by Google Inc. of Mountain View, Calif. (referred to as "Google"), delivers ads targeted to keywords from search queries. Similarly, content targeted ad delivery systems have been proposed. For example, U.S. patent application Ser. No. 10/314,427 (incorporated herein by reference and referred to as "the '427 application"), titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and Ser. No. 10/375,900 (incorporated by reference and referred to as "the '900 application"), titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example. Content targeted ad delivery systems, such as the AdSense advertising system by Google for example, have been used to serve ads on Web pages.

As can be appreciated from the foregoing, serving ads relevant to concepts of text in a text document and serving ads relevant to keywords in a search query are useful because such ads presumably concern a current user interest. Consequently, such online advertising has become increasingly popular. Moreover, advertising using other targeting techniques, and even untargeted online advertising, has become increasingly popular.

Currently, ads delivered with audio content, such as Internet audio streams (e.g., podcasts or Internet radio stations) for example, are typically based on a "reservation" model. That is, an advertiser reserves a spot in the audio stream for a fixed fee. Unfortunately, however, the reservation model doesn't necessarily maximize revenue for the audio publisher because many advertisers that don't have the resources to negotiate agreements for such ad spots don't compete for those ad spots. Further, from the perspective of the end-user (i.e., the person or persons to whom the audio content is delivered), the ad could be totally irrelevant or not as useful as it could be.

Existing advertising systems, such as systems that insert ads into audio content (e.g., audio streams, or more generally, an "audio document"), could be improved. For example, it would be useful to improve the relevancy of ads served in (or with) an audio document. It would also be useful to improve the value, in terms of potential advertising revenue, of such an audio document. It would be especially useful to improve the value, in terms of potential advertising revenue, of an aggregate of multiple instances of an audio document.

§2. SUMMARY OF THE INVENTION

Embodiments consistent with the present invention may improve the serving of advertisements with (e.g., on) audio documents. For example, at least some embodiments consistent with the present invention may (a) accept information defining at least one ad spot associated with at least one instance of an audio document, (b) accept offers to have advertisements served in the ad spot(s), and (c) arbitrate among competing advertisements, using at least the offers, to determine at least one advertisement to be served in that ad spot(s).

At least some embodiments consistent with the present invention may (a) accept relevance information for an advertisement, (b) determine at least one audio document using the accepted relevance information, (c) present information about the audio document(s) to an advertiser associated with the advertisement, and (d) accept, from the advertiser, an offer to have its advertisement served with at least one of the audio document(s) accepted.

At least some embodiments consistent with the present invention may (a) accept relevance information for an audio document, (b) determine a plurality of advertisements relevant to the audio document using the relevance information and serving constraints of the advertisements, and (c) select at least one of the determined relevant advertisements to be served with the audio document.

Examples of documents consistent with the present invention include radio programs, live or recorded musical works with lyrics, live or recorded dramatic works with dialog or a monolog, live or recorded talk shows, voice mail, segments of an audio conversation, etc.

§3. BRIEF DESCRIPTION OF THE DRAWINGS

§4. DETAILED DESCRIPTION

Figure 1:
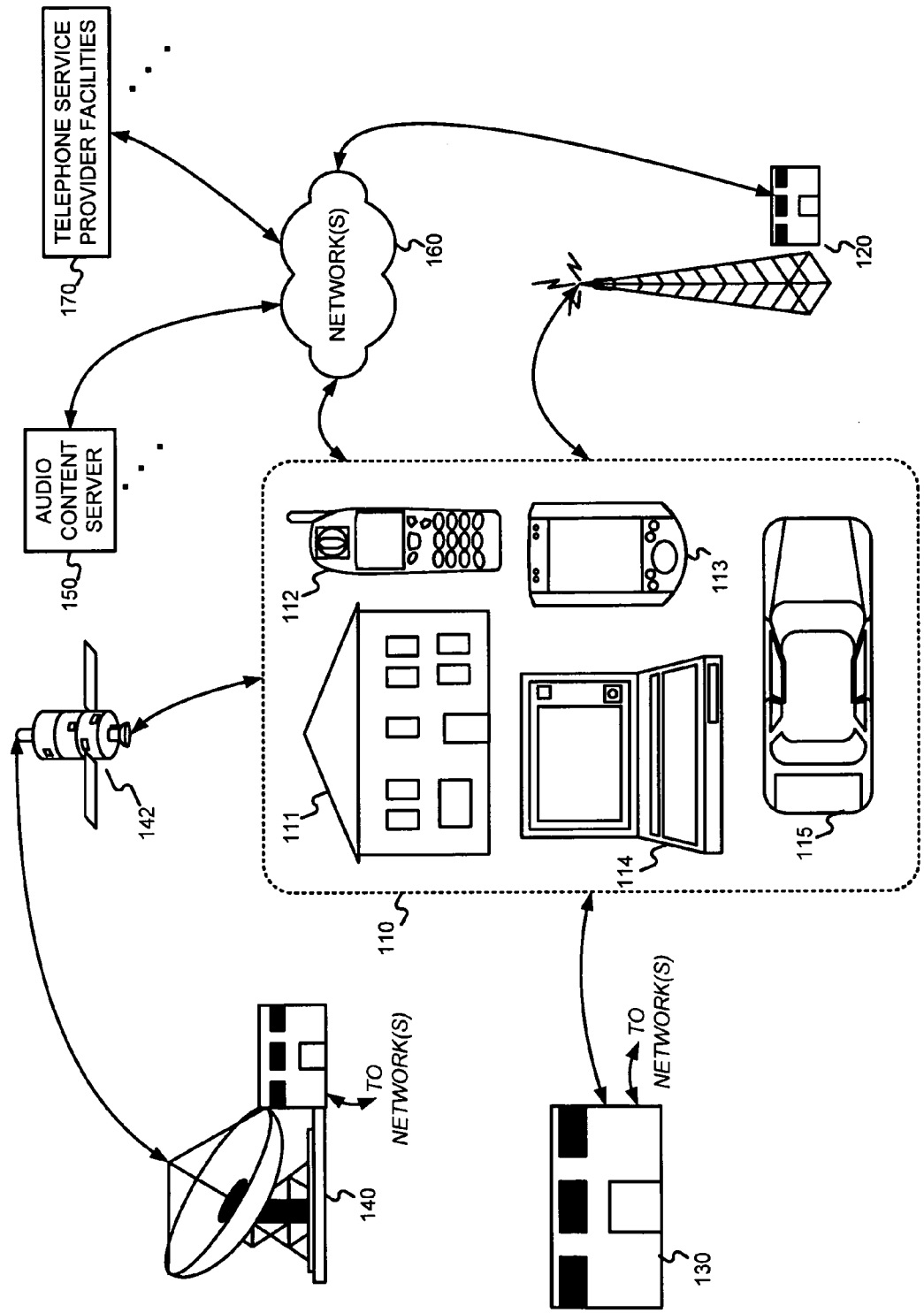
FIG. 1 is a diagram illustrating various ways audio content can be delivered and received.

The present invention may involve novel methods, apparatus, message formats, and/or data structures for improving advertising with audio content. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventor regards his invention to include any patentable subject matter described.

In the following definitions of terms that may be used in the specification are provided in §4.1. Then, environments in which, or with which, the present invention may operate are described in §4.2. Exemplary embodiments of the present invention are described in §4.3. Thereafter, specific examples illustrating the utility of exemplary embodiments of the present invention are provided in §4.4. Finally, some conclusions regarding the present invention are set forth in §4.5.

§4.1 DEFINITIONS

Online ads, such as those used in the exemplary systems described below with reference to FIGS. 2 and 3, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. In the case of an audio ad, ad features may include audio content. The ad features may also include executable code (e.g., encoded as tones, provided in non-audio packets of an audio stream, etc.). Depending on the type of online ad, ad features may include one or more of the following: text, a link, an audio file, a video file, an image file, executable code, embedded information, etc. In devices that can render more than one type of media (devices that have different outputs), some ad features may pertain to one type of media rendered to the user over one output, while other ad features may pertain to another type of media rendered to the user over another output. For example, if an MP3 player includes a display, an ad to be rendered on such a player can have an audio component and/or a text component. As another example, if a mobile telephone includes a speaker, a display and telephony means, an ad to be rendered on such a telephone can have one or more of an audio component, a text component, an image component and executable code for dialing an encoded telephone number. Naturally, other types of ad features are possible.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, an ad spot in which the ad was served (e.g., a position (spatial or temporal) of the ad relative to other ads served), an absolute size of the ad, a size of the ad relative to other ads, an absolute volume of the ad, a volume of the ad relative to other ads, an absolute temporal length of the ad, a relative temporal length of the ad, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document, on which, or with which, the ad is to be served, includes certain topics or concepts, or falls under a particular cluster or clusters, or some other classification or classifications (e.g., verticals). In some systems, an advertiser may specify that its ad is to be served only to (or is not to be served to) user devices having certain characteristics. Finally, in some systems, an ad might be targeted so that it is served in response to a request sourced from a particular location, or in response to a request concerning a particular location.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs, dial-throughs, etc.) of an ad to the number of impressions of the ad (i.e., the number of times an ad is rendered) is defined as the "selection rate" (or "clickthrough rate" or "CTR") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, dialing a telephone number, sending a product or service inquiry, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) and the ratio of the number of conversions to the number of selections (or the number of some other earlier event) are both referred to as the "conversion rate" or "CR." The type of conversion rate will be apparent from the context in which it is used. If a conversion is defined to be able to occur within a predetermined time since the serving of an ad, one possible definition of the conversion rate might only consider ads that have been served more than the predetermined time in the past.

A "property" is something on which ads can be presented. A property may include online content (e.g., a Website, an MP3 audio program, a Webcast, a podcast, online games, etc.), offline content (e.g., a newspaper, a magazine, a theatrical production, a concert, a sports event, a radio broadcast, etc.), and/or offline objects (e.g., a billboard, a stadium score board, an outfield wall, the side of truck trailer, etc.). Properties with content (e.g., magazines, newspapers, Websites, email messages, audio programs, etc.) may be referred to as "media properties." Although properties may themselves be offline, pertinent information about a property (e.g., attribute(s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.). An "audio property" is a property that can be heard.

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, sound, conversations, etc.) and some indication of the meaning of that content (for example, e-mail fields and associated data, HTML tags and associated data, embedded song title and artist information, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website, a Web page, a Webcast, etc.

An "audio document" is a document that can be heard when played or decoded. An "audio document" may include audio content regardless of whether or not that content is ultimately stored on a tangible medium. An audio document may include, for example, a live or recorded radio program, a live or recorded musical work (e.g., with lyrics), a live or recorded dramatic work including a dialog or a monolog, a live or recorded talk show, voice mail, a conversation, voice messages, etc. Each of different forms or formats of the same audio content (e.g., original, compressed, packetized, streamed, etc.) may be considered to be an audio document (e.g., the same audio document, or different audio documents). Embodiments consistent with the present invention may work with various audio and music file formats such as, for example, Compressed Audio Interchange Format File ("AIFC"), Audio Interchange Format File Spec ("AIFF"), Microsoft Advanced Streaming Format ("ASF"), Windows Media Audio ("WMA"), Sun Audio File (linear m-law or A-law) ("AU"), CD Audio Track ("CDA"), Standard MIDI song/track information ("MID"), Moving Picture Experts Group (MPEG) Audio Layer I, II and III compressed audio ("MP3"), RealNetworks RealAudio compressed streaming data ("RA"), Audio for Windows ("WAV"), etc. Embodiments consistent with the present invention may work with other audio and music file formats.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual or audio content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a streaming audio file player from Microsoft Corporation of Redmond, Wash., or from RealNetworks, Inc., of Seattle, Wash., etc.), a viewer (e.g., an Abobe Acrobat pdf reader), etc.

A "content owner" is a person or entity that has some property right in the content of a media property (e.g., document). A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

§4.2 Exemplary Advertising Environments in Which, or with Which, the Present Invention may Operate FIG. 1 is a diagram illustrating various ways audio content can be delivered and received. Audio content can be consumed at various client locations, using various devices 110 such as, for example, a customer premises 111 (such as a home residence or business which may include computers, radios, audio players, televisions, telephones, etc.), a mobile telephone 112, an audio player 113, a laptop computer 114, a car radio 115, etc. Audio content may be transmitted from various sources such as, for example, terrestrial radio (or television, or telephony, or data) transmission stations 120, cable television (or radio, or telephony, or data) transmission stations 130, satellite radio (or television, or telephony, or data) transmission stations 140, via satellites 142, and audio content servers (e.g., Webcasting servers, podcasting servers, audio streaming servers, audio download Websites, etc.) 150, via network(s) 160 such as the Internet for example, and telephone service providers 170 via network(s) 160 such as the Public Switched Telephone Network ("PSTN") and the Internet for example. Although not all connections are shown, one or more of the transmission stations 120, 130 and 140 may be coupled with the network(s) 160.

Figure 2:
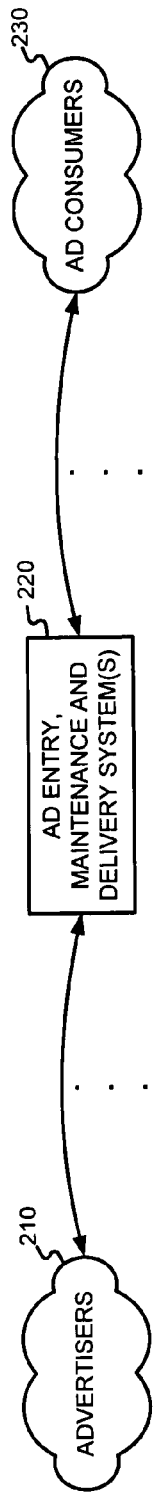
FIG. 2 is a diagram showing parties or entities that can interact with an advertising system.

FIG. 2 is a diagram of an advertising environment. The environment may include an ad entry, maintenance and delivery system (simply referred to as an ad server) 220. Advertisers 210 may directly, or indirectly, enter, maintain, and track ad information in the system 220. The ads may be in the form of graphical ads such as so-called banner ads, text only ads, image ads, audio ads, video ads, ads combining one of more of any of such components, etc. The ads may also include embedded information, such as a link, a telephone number, an e-mail address, and/or machine executable instructions. Ad consumers 230 may submit requests for ads to, accept ads responsive to their request from, and provide usage information to, the system 220. An entity other than an ad consumer 230 may initiate a request for ads. Although not shown, other entities may provide usage information (e.g., whether or not a conversion or selection related to the ad occurred) to the system 220. This usage information may include measured or observed user behavior related to ads that have been served.

The ad server 220 may be similar to the one described in the '900 application. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, etc.), and price information (e.g., cost, average cost, or maximum cost (per impression, per selection, per conversion, etc.)). Therefore, a single cost, a single maximum cost, and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or server). Alternatively, or in addition, each ad may include embedded information for initiating a telephone call (e.g., to facilitate providing product or service information, or to facilitate completing an order). Alternatively, or in addition, each ad may include information for initiating a message (e.g., facilitate providing product or service information, or to facilitate completing an order). Naturally, the ad information may include more or less information, and may be organized in a number of different ways.

Figure 3:
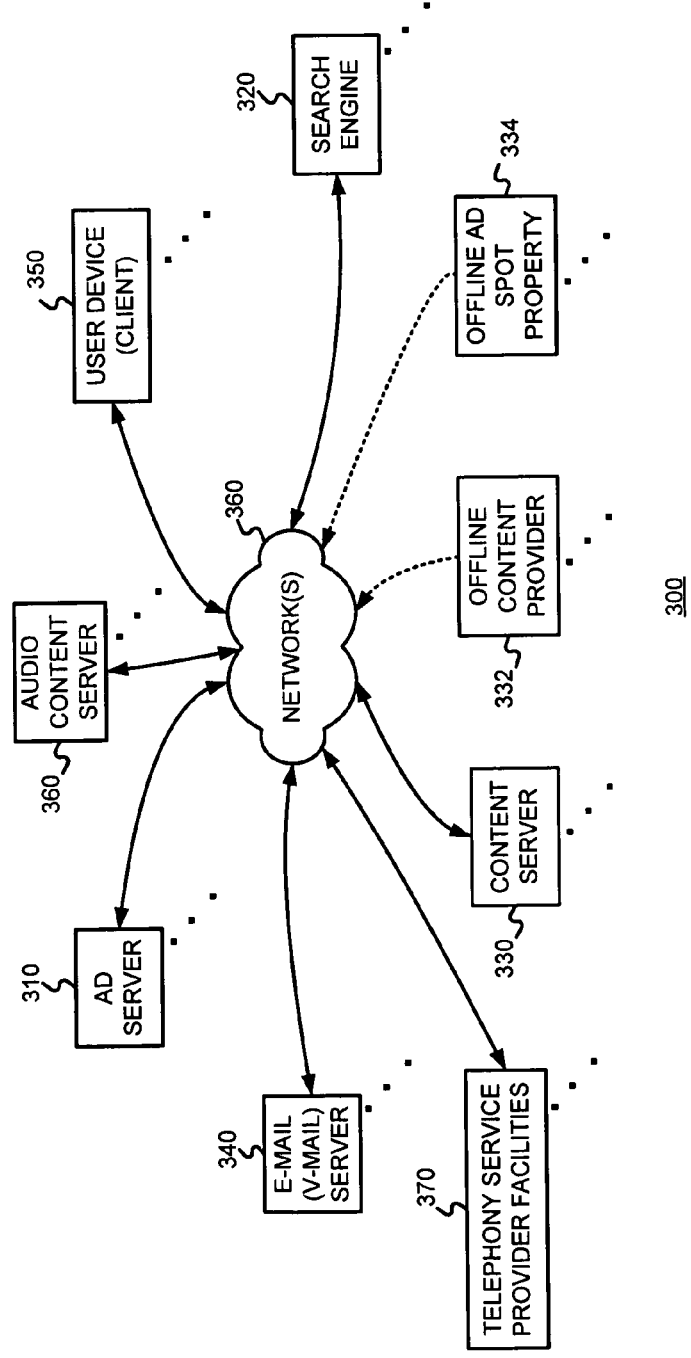
FIG. 3 is a diagram illustrating an environment in which, or with which, embodiments consistent with the present invention may operate.

FIG. 3 illustrates an environment 300 in which the present invention may be used. A user device (also referred to as a "client" or "client device") 350 may include a media player (e.g., an MP3 player, a streaming audio player, a radio, a television, etc.) a browser facility (such as the Explorer browser from Microsoft, the Opera Web Browser from Opera Software of Norway, the Navigator browser from AOL/Time Warner, the Firefox browser from Mozilla, etc.), an e-mail facility (e.g., Outlook from Microsoft), telephony means, etc. A search engine 320 may permit user devices 350 to search collections of documents (e.g., Web pages). A content server 310 may permit user devices 350 to access documents, such as audio documents for example. An e-mail server (such as GMail from Google, Hotmail from Microsoft Network, Yahoo Mail, etc.) 340 may be used to provide e-mail functionality to user devices 350. The e-mails may include audio attachments and/or voice messages. An ad server 310 may be used to serve ads to user devices 350. The ads may be served in association with search results provided by the search engine 320. However, content-relevant ads may be served in association with content provided by the content server 330, e-mail supported by the e-mail server (or voice-mail supported by a voice-mail server) 340 and/or user device e-mail facilities, audio content served by audio server 360 and/or played by user device audio player facilities. Telephone service provider facilities 370 may be used to provide telephone or walkie-talkie services over the network(s) 360. For example, some companies provide voice over Internet Protocol ("VoIP") services, As discussed in the '900 application, ads may be targeted to documents served by content servers. Thus, one example of an ad consumer 230 is a general content server 330 that receives requests for documents (e.g., articles, discussion threads, music, audio (e.g., musical works, dramatic works, voice-mail, talk shows, etc.), video, graphics, search results, Web page listings, etc.), and retrieves the requested document in response to, or otherwise services, the request. The content server may broadcast content as well (e.g., not necessarily responsive to a request). The content server may submit a request for ads to the ad server 220/310. Such an ad request may include a number of ads desired. The ad request may also include document request information. This information may include the document itself (e.g., a page, a music file, an audio file, a segment of an audio stream, etc.), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 330 may combine the (e.g., requested) document with one or more of the advertisements provided by the ad server 220/310. This combined information including the document content and advertisement(s) is then forwarded towards the end user device 350 that requested the document or that configured itself to receive the document, for presentation to the user. Finally, the content server 330 may transmit information about the ads and how, when, and/or where the ads are to be rendered (e.g., ad spot, position, selection or not, impression time, impression date, size, temporal length, volume, conversion or not, etc.) back to the ad server 220/310. Alternatively, or in addition, such information may be provided back to the ad server 220/310 by some other means.

The offline content provider 332 may provide information about ad spots in an upcoming publication, and perhaps the publication (e.g., the content or topics or concepts of the content), to the ad server 310. In response, the ad server 310 may provide a set of ads relevant the content of the publication for at least some of the ad spots. Examples of offline content providers 332 include, for example, magazine publishers, newspaper publishers, book publishers, offline radio broadcasts, offline music publishers, offline video game publishers, a theatrical production, a concert, a sports event, etc.

Owners of the offline ad spot properties 334 may provide information about ad spots in their offline property (e.g., a stadium scoreboard banner ad for an NBA game in San Antonio, Tex.). In response, the ad sever may provide a set of ads relevant to the property for at least some of the ad spots. Examples of offline properties 334 include, for example, a billboard, a stadium score board, and outfield wall, the side of truck trailer, etc.

Another example of an ad consumer 230 is the search engine 320. A search engine 320 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 320 may submit a request for ads to the ad server 220/310. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 320 may combine the search results with one or more of the advertisements provided by the ad server 220/310. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 320 may transmit information about the ad and when, where, and/or how the ad was to be rendered (e.g., position, selection or not, impression time, impression date, size, conversion or not, etc.) back to the ad server 220/310. Alternatively, or in addition, such information may be provided back to the ad server 220/310 by some other means.

The e-mail server 340 may be thought of, generally, as a content server in which a document served is simply an e-mail. Further, e-mail applications (such as Microsoft Outlook for example) may be used to send and/or receive e-mail. Therefore, an e-mail server 340 or application may be thought of as an ad consumer 230. Thus, e-mails may be thought of as documents, and targeted ads may be served in association with such documents. For example, one or more ads may be served in, under, over, or otherwise in association with an e-mail. Although not shown, a voice-mail server may be thought of, generally, as a content server.

The audio server 360 may be thought of, generally, as a content server in which a document served is simply an audio document, such as an audio stream or an audio file for example. Further, audio player applications (such as RealNetwork's Real media player, Microsoft's Media Player, Apple's Quicktime player, etc.) may be used to render audio files. Therefore, an audio server 360 or application may be thought of as an ad consumer 240. Thus, ads may be served in association with audio documents. For example, one or more ads may be served before, during, or after an audio song, program, program segment, etc. Alternatively, one or more ads may be served in association with an audio song, program, program segment, etc.

Finally, the telephone service provider facilities 370 may also consume ads, such as ads relevant to a topic or topics of a telephone conversation.

Although the foregoing examples described servers as (i) requesting ads, and (ii) combining them with content, one or both of these operations may be performed by a client device (such as an end user computer for example).

§4.3 Exemplary Embodiments

Figure 4:
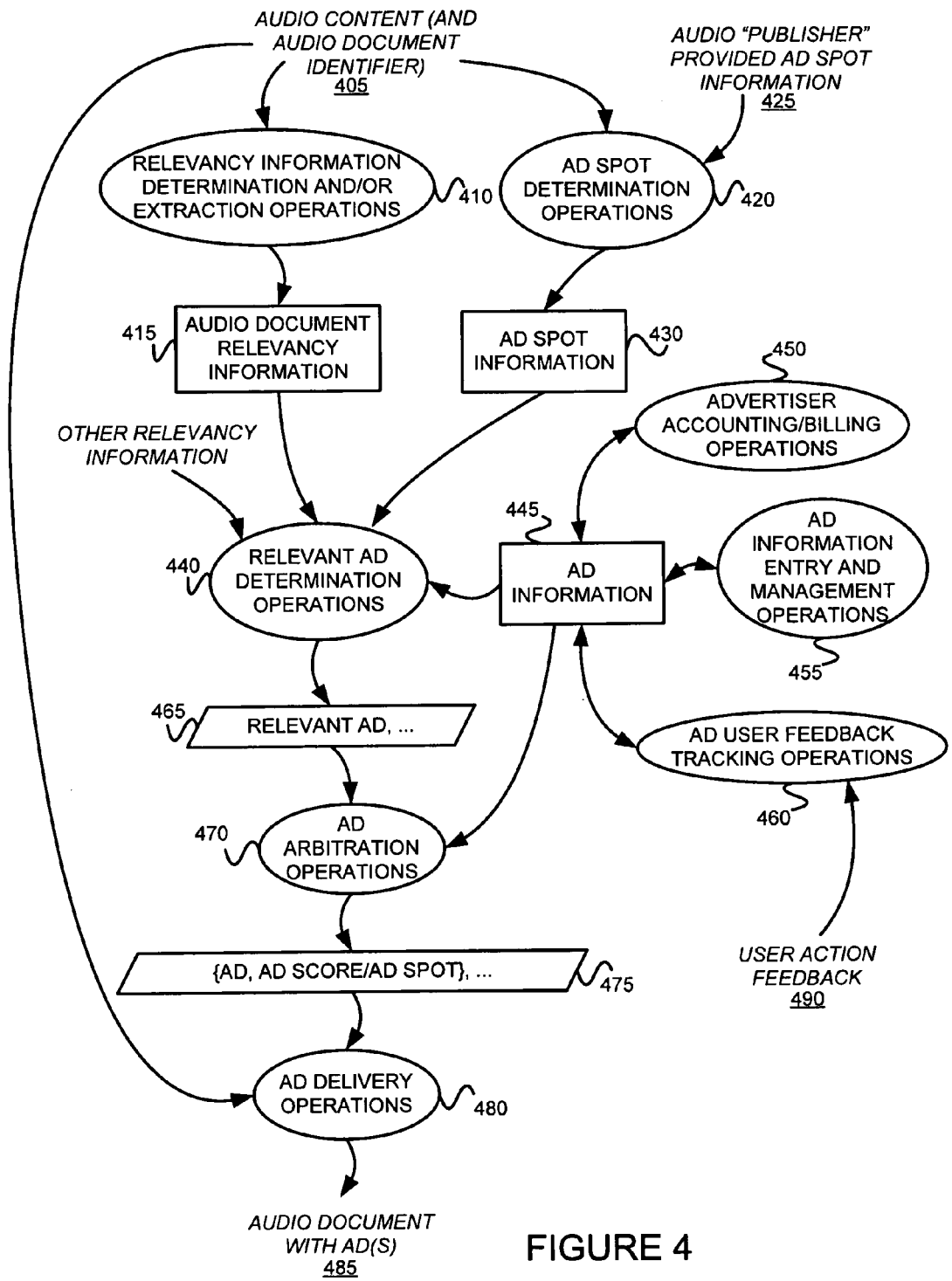
FIG. 4 is a bubble diagram of exemplary operations that may be performed in a manner consistent with the present invention, as well as information that may be used and/or generated by such operations.

FIG. 4 is a bubble diagram of exemplary operations that may be performed in a manner consistent with the present invention, as well as information that may be used and/or generated by such operations. The operations may include one or more of relevancy information determination and/or extraction operations 410, ad spot determination operations 420, relevant ad determination operations 440, advertiser accounting/billing operations 450, ad information entry and management operations 455, ad user feedback tracking operations 460, ad arbitration operations 470 and ad delivery (e.g., insertion) operations 480. The information may include audio document relevancy information 415, ad spot information 430, and ad information 445.

Relevancy information determination and/or extraction operations 410 may accept audio content (and perhaps an audio document identifier) 405 and generate audio document relevancy information 415. Exemplary methods for performing such relevancy information determination and/or extraction operations 410 are described below with reference to FIG. 8. Exemplary data structures for storing such audio document relevancy information 415 are described below with reference to FIG. 5.

Ad spot determination operations 420 may accept audio content 405 and/or audio publisher provided ad spot information 425 and may generate ad spot information 430. Exemplary methods for performing such ad spot determination operations 420 are described below with reference to FIG. 9. Exemplary data structures for storing such ad spot information 430 are described below with reference to FIG. 6.

Relevant ad determination operations 440 may use audio document relevancy information 415, ad spot information 430, and ad information 445 (and perhaps other relevancy information) to generate one or more relevant ads 465. Exemplary methods for performing relevant ad determination operations 440 are described below with reference to FIG. 10. Exemplary data structures for storing ad information are described below with reference to FIG. 7.

Ad arbitration operations 470 may use ad information 445 to score the relevant ads 465 and to generate associations 475 of relevant ads to ad spots. Exemplary methods for performing ad arbitration operations 470 are described below with reference to FIG. 11.

Ad delivery operations 480 may accept ad, ad spot associations 475 and serve the ads in association with (e.g., insert the ad into) audio content 405. For example, a mixer may be used to combine an audio ad with an appropriate portion (e.g., an ad spot) of an audio document. Such insertion may occur, for example, at the audio content server, and/or at the client device.

Advertiser accounting/billing operations 450, ad information entry and management operations 455 and ad user feedback tracking operations 460 may be performed using techniques described in the '427 application and in the '900 application, and/or may use techniques known to those skilled in the art.

§4.3.1 Exemplary Methods and Data Structures

Figure 8:
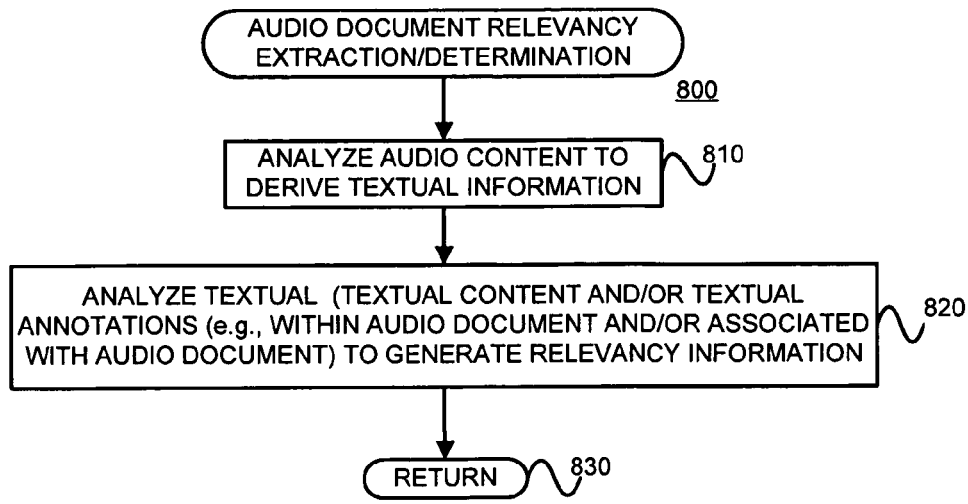
FIG. 8 is a flow diagram of an exemplary method for extracting and/or determining relevancy information for an audio document in a manner consistent with the present invention.

FIG. 8 is a flow diagram of an exemplary method 800 for extracting and/or determining relevancy information for an audio document (or a segment thereof) in a manner consistent with the present invention. Audio content from the audio document may be analyzed to derive textual information. (Block 810) Textual information may then be analyzed to generate relevancy information (Block 820) before the method 800 is left (Node 830).

Referring back to block 810, textual information may be derived from audio information by performing speech recognition on various audio feeds, producing hypothesized words annotated with confidence scores, or producing a lattice which contains many hypotheses (therefore less likely to miss a keyword). Converting audio to text can be achieved by known automatic speech recognition techniques. (See, e.g., Kai-Fu Lee, "Automatic Speech Recognition—The Development of the SPHINX System," Kluwer Academic Publishers, Norwell, Mass., 1989, incorporated herein by reference.)

Once a (e.g., rough) transcription is available, relevance information (e.g., terms, weighted terms, concepts, weighted concepts, categories (e.g., vertical categories), weighted categories, etc.) may be derived from the transcription and used to select relevant ads. Even if current speech recognition technology is not accurate enough for certain end user applications, it may be good enough to provide a rough transcription, from which a gist (or topic(s)) of an audio document can be determined.

Referring back to block 820, the textual information may be analyzed to generate relevancy information using various techniques, such as those described in the '427 and '900 applications, and those described in U.S. patent application Ser. No. 11/112,716 (incorporated herein by reference and referred to as "the '716 application"), filed on Apr. 22, 2005, titled "CATEGORIZING OBJECTS, SUCH AS DOCUMENTS AND/OR CLUSTERS, WITH RESPECT TO A TAXONOMY AND DATA STRUCTURES DERIVED FROM SUCH CATEGORIZATION" and listing David Gehrking, Ching Law and Andrew Maxwell as inventors, etc. Relevancy information may include, for example, one or more of term vectors, weighted term vectors, clusters, weighted clusters, categories (e.g., vertical categories), weighted categories, etc. The clusters may be probabilistic hierarchical inferential learner (referred to as "PHIL") clusters, such as those described in U.S. Provisional Application Ser. No. 60/416,144 (referred to as "the '144 provisional" and incorporated herein by reference), titled "Methods and Apparatus for Probabilistic Hierarchical Inferential Learner," filed on Oct. 3, 2002, and U.S. patent application Ser. No. 10/676,571 (referred to as "the '571 application" and incorporated herein by reference), titled "Methods and Apparatus for Characterizing Documents Based on Cluster Related Words," filed on Sep. 30, 2003 and listing Georges Harik and Noam Shazeer as inventors. Such PHIL clusters may be generated, for example, using the techniques described in the '144 provisional and the '571 application. The source of the textual information may be that derived from an analysis of the audio content, such as in block 810.

Alternatively, or in addition, the audio publisher (or some other entity) may have annotated the audio document with textual information or encoded textual information in the audio content (e.g., in packets, portions of packets, portions of streams, headers, footers, etc.). For example, a radio broadcaster may provide in their broadcast, a station identifier, a song identifier, an artist identifier, an album identifier, a program identifier, location information, etc. In this case, genre and location information might be derived from the audio broadcast. Such relevance information may be used to target relevant ads. As another example, compact disks may encode information about an album, an artist, a list of songs, etc. Genre information may be derived from the artist, album and/or songs. Further, such information may be used to lookup textual lyrics of the songs. As yet another example, a voice message may have an associated IP address, or a telephone conversation may have an area code, from which location information can be derived. As yet another example, a program may be annotated with keywords, topics, etc. Such relevance information may be used to target relevant ads.

Alternatively, or in addition, the audio information may be analyzed to generate other types of relevancy information. For example, the gender (e.g., due to pitch, tone, etc,), nationality, and/or ethnicity (e.g., due to language, accent, etc.) of a speaker in voice audio content (e.g., a participant in a conversation) may be determined from audio analysis. (See, e.g., M. A. Siegler, U. Jain, B. Raj, and R. M. Stern, "Automatic Segmentation, Classification and Clustering of Broadcast News Audio," *Proceedings of the Ninth Spoken Language Systems Technology Workshop*, Harriman, N.Y., 1996; and Greg Sanders, "Metadata Extraction for EARS," *Rich Transcription Workshop*, Vienna, Va., 2002 (both incorporated herein by reference).)

Figure 5:
FIG. 5 illustrates an exemplary data structure for storing audio document relevancy information in a manner consistent with the present invention.

FIG. 5 illustrates an exemplary data structure 500 for storing audio document relevancy information in a manner consistent with the present invention. As shown, the data structure 500 may include a plurality of entries corresponding to a plurality of rows. Each entry may include an audio document identifier 510 and relevancy information 520. The relevancy information may include one or more of terms, weighted terms, concepts, weighted concepts, clusters, weighted clusters, vertical categories, weighted vertical categories, location information, user information, etc.

Figure 9:
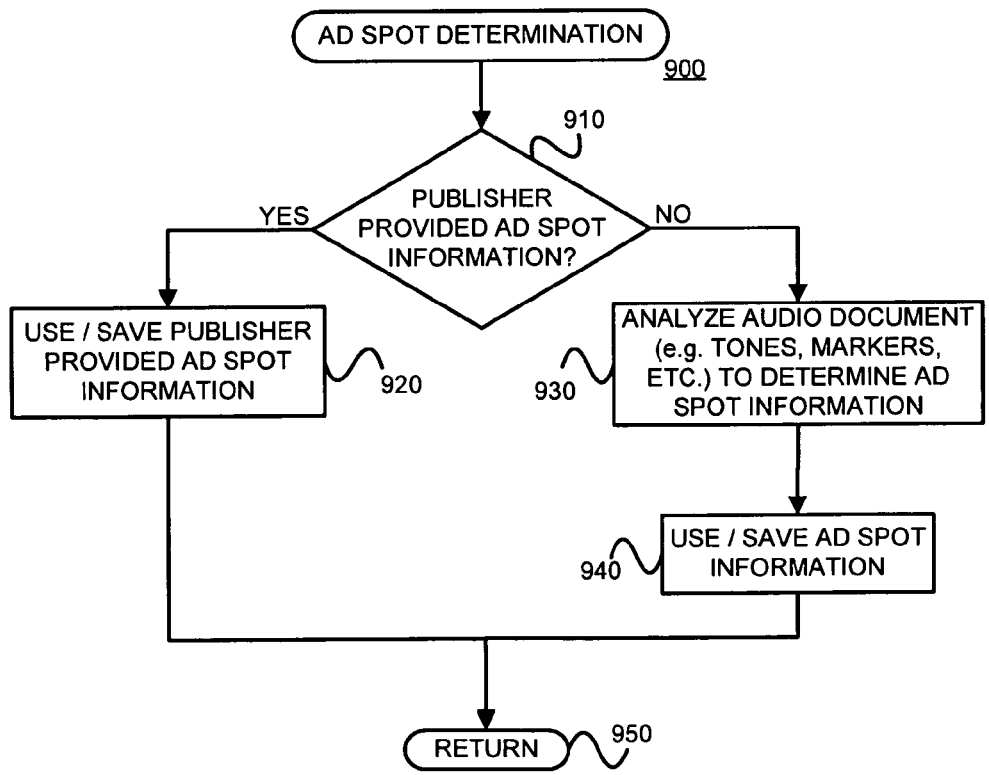
FIG. 9 is a flow diagram of an exemplary method for determining ad spots in a manner consistent with the present invention.

FIG. 9 is a flow diagram of an exemplary method 900 for determining ad spots in a manner consistent with the present invention. It may be determined whether or not an audio document publisher (e.g., an Internet radio station, or some other entity) provided ad spot information. (Decision block 910) That is, ad spot information may be associated with a document, but provided separately from (i.e., not included in) the document. If so, the provided ad spot information may be used and/or saved for later use (Block 920) before the method 900 is left (Node 950). Referring back to decision block 910, if the publisher or some other entity did not provide ad spot information, the audio document may be analyzed to determine ad spot information (Block 930). The determined ad spot information may then be used and/or saved for later use (Block 940) before the method 900 is left (Node 950).

Referring back to block 920, the audio publisher or some other entity may provide absolute or relative times when ad spots are to start. The publisher or some other entity may further provide duration or times when the ad spots are to stop. For example, an audio publisher may specify that a first ad spot is to start at 8:20 AM EST and last two (2) minutes, a second ad spot is to start at 8:40 AM EST and last four (4) minutes and a third ad spot is to start at 8:52 and last six (6) minutes. As another example, an audio publisher may specify that a three (3) minute ad spot is to occur every 30 minutes starting at 8:00 AM EST. As yet another example, an audio publisher may specify that a two (2) minute ad spot is to occur every 15 minutes after the start of an audio program, and a four (4) minute ad spot is to occur 50 minutes into the audio program.

Referring back to block 930, the audio document itself may be analyzed to determine ad spot information. That is, ad spot information may be carried in the audio document itself. For example, audio tones embedded within an audio program may encode that an X second ad spot is to start in Y seconds. As another example, data carried in packets of an audio stream may specify ad spot information.

Figure 6:
FIG. 6 illustrates an exemplary data structure for storing ad spot information in a manner consistent with the present invention.

FIG. 6 illustrates an exemplary data structure 600 for storing ad spot information in a manner consistent with the present invention. As shown, the data structure 600 may include a plurality of entries corresponding to a plurality of rows. Each entry may include an ad spot identifier 610 and ad spot information 620. The ad spot identifier 610 may include an audio document identifier to which the ad spot belongs. The ad spot information 620 may include information related to when the ad spot is to occur (e.g., start date and time and duration, start date and time and end date and time, time from reference time to start and duration, times from reference time to start and end, etc.). In addition, the ad spot information may include policy information such as filters. One class of filters may include those that filter ads based on their content of the ad. For example, an audio program which talks about healthy living might filter out ads for cigarettes. As another example, an audio program for kids might filter out ads which may include obscene or suggestive language. As yet another example, an audio program dealing with gambling addition may filter out ads for casinos. Another class of filters may include those that filter based on the source of the ad. For example, an Internet radio station might block ads for programs on a competing Internet radio station. Other techniques for implementing advertising policies, such as those described in U.S. patent application Ser. No. 10/656,917 (incorporated herein by reference and referred to as "the '917 application"), titled "IDENTIFYING AND/OR BLOCKING ADS SUCH AS DOCUMENT-SPECIFIC COMPETITIVE ADS", filed on Sep. 5, 2003 and listing Brian Axe, Rama Ranganath and Narayanan Shivakumar as inventors; and U.S. patent application Ser. No. 10/937,460 (incorporated herein by reference and referred to as "the '460 application"), titled "FACILITATING THE BLOCKING OF AD SERVING", filed on Sep. 9, 2004 and listing Vibhu Mittal, Peter Norvig and Mehran Sahami as inventors, for example, may be used.

The ad spot information 620 may also include information such as, for example, one or more of the source location of the audio program including the ad spot, the destination location of the client device receiving the audio program including the ad spot, a client device type receiving the audio program including the ad spot, etc.

Although some of the exemplary ad spots described above had a definite length, ads needn't have a fixed or determined length. For example, in the context of a media player with a display screen, a text ad may be displayed (e.g., for a time period defined by the advertiser, for a period of time defined by the audio publisher, until the next ad spot, etc.) without interrupting the audio program.

Figure 10:
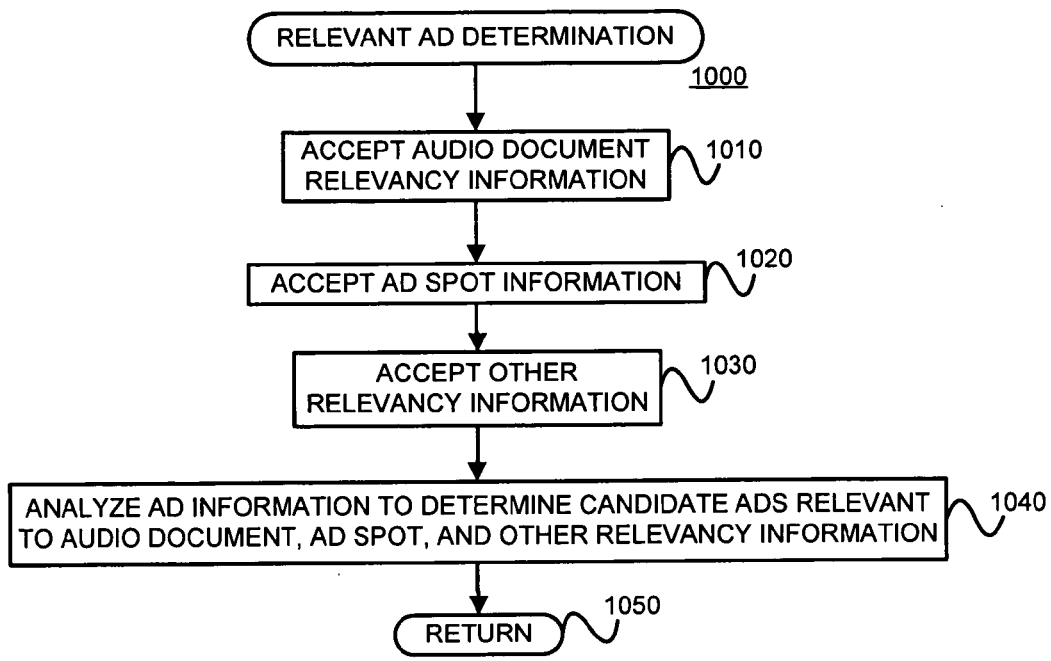
FIG. 10 is a flow diagram of an exemplary method for determining ads relevant to ad spots in an audio document in a manner consistent with the present invention.

FIG. 10 is a flow diagram of an exemplary method 1000 for determining ads relevant to ad spots in an audio document in a manner consistent with the present invention. As shown, audio document relevancy information, such as that stored in the data structure 500 of FIG. 5 for example, may be accepted. (Block 1010) Alternatively, or in addition, ad spot information, such as audio document source location, client device location, client device type, time, date, etc. may be accepted. (Block 1020) Alternatively, or in addition, other relevancy information such as, for example, one or more of end user information (e.g., past behavior, demographics, etc.), source information (e.g., alternative music station, classical music station, sports talk station, news station, etc.), etc. may be accepted. (Block 1030) Ad information may then be analyzed to determine candidate ads relevant to the audio document, ad spot, and/or other relevancy information. (Block 1040) For example, techniques such as those described in the '427 and '900 patent applications may be used. The method 1000 is then left. (Node 1050)

Referring back to block 1040, the ad information may include targeting information provided by the advertiser. Alternatively, or in addition, the ad information may include targeting information derived from the ad creative and/or information associated with the ad such as an ad landing page. Such targeting information may include one or more of keywords, vertical categories, genres, concepts, audio program identifiers, audio server identifiers, user identifiers, user types, locations, times, dates, client devices, other serving constraints, etc.

Figure 11:
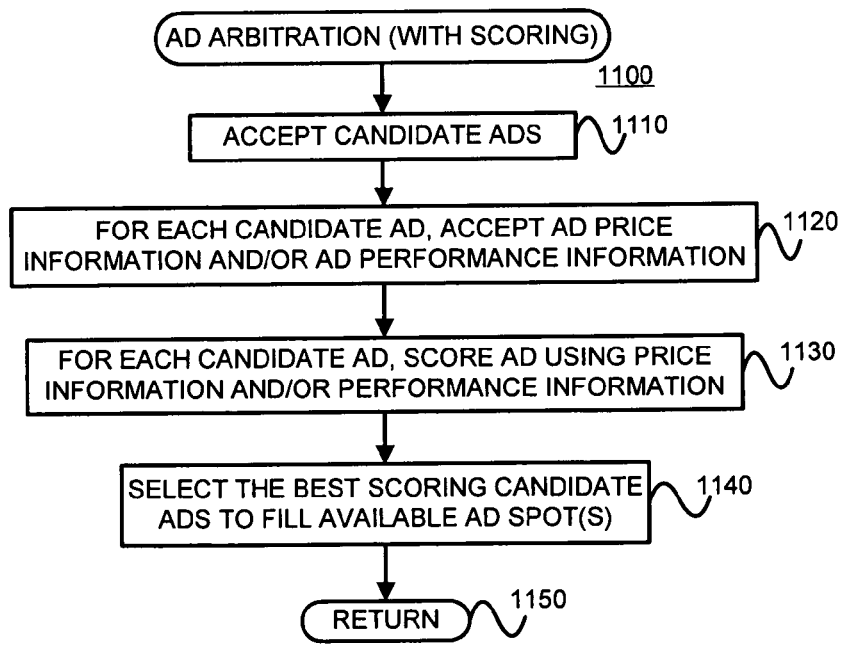
FIG. 11 is a flow diagram of an exemplary method for arbitrating relevant ads competing for audio document ad spots in a manner consistent with the present invention.

FIG. 11 is a flow diagram of an exemplary method 1100 for arbitrating relevant ads competing for ad spots in an audio document in a manner consistent with the present invention. Candidate ads are accepted. (Block 1110) For each candidate ads, price information and/or performance information may be accepted (Block 1120), and each of the candidate ads may be scored using the price information and/or performance information (Block 1130). Alternatively, or in addition, the score may consider a degree of relevancy of the ad to the audio document (or segment thereof). Finally, the best scoring candidate ads are selected to fill available ad spots (Block 1140) before the method 1100 is left (Node 1150).

Referring back to block 1120, the price information may be, for example, a price per impression, a maximum price per impression, a price per selection, a maximum price per selection, a price per conversion, a maximum price per conversion, etc. The performance information may be, for example, a selection rate, a conversion rate, end user ratings, etc.

Referring back to block 1130, the candidate ads may be scored using, for example, techniques described in U.S. patent application Ser. No. 10/112,656 (incorporated herewith and referred to as "the '656 application"), titled "METHODS AND APPARATUS FOR ORDERING ADVERTISEMENTS BASED ON PERFORMANCE INFORMATION", filed on Mar. 29, 2002 and listing Georges R. Harik, Lawrence E. Page, Jane Manning and Salar Arta Kamangar as inventors; U.S. patent application Ser. No. 10/112,654 (incorporated herein by reference and referred to as "the '654 application"), titled "METHODS AND APPARATUS FOR ORDERING ADVERTISEMENTS BASED ON PERFORMANCE INFORMATION AND PRICE INFORMATION", filed on Mar. 29, 2002 and listing Salar Arta Kamangar, Ross Koningstein and Eric Veach as inventors; U.S. patent application Ser. No. 10/452,791 (incorporated herein by reference and referred to as "the '791 application"), titled "SERVING ADVERTISEMENTS USING USER REQUEST INFORMATION AND USER INFORMATION", filed on Jun. 2, 2003 and listing Krishna Bharat, Stephen Lawrence, Mehran Sahami and Amit Singhal as inventors; U.S. patent application Ser. No. 10/610,322 (incorporated herein by reference and referred to as "the '322 application"), titled "RENDERING ADVERTISEMENTS WITH DOCUMENTS HAVING ONE OR MORE TOPICS USING USER TOPIC INTEREST INFORMATION", filed on Jun. 30, 2003 and listing Krishna Bharat as the inventor; U.S. patent application Ser. No. 10/877,790 (incorporated herein by reference and referred to as "the 790 application"), titled "COST DISCOUNTING TO PROVIDE DOMINANT PARTICIPATION STRATEGY ARBITRATION FOR ONLINE ADVERTISING AND ARBITRATIONS SUPPORTING OFFERS FROM DIFFERENT COST DISCOUNTING METHODOLOGIES", filed on Jun. 25, 2004 and listing John Lamping, Robert Shillingsburg and Eric Veach as inventors; U.S. patent application Ser. No. 11/169,323 (incorporated herein by reference and referred to as "the '323 application"), titled "USING THE UTILITY OF CONFIGURATIONS IN AD SERVING DECISIONS", filed on Jun. 28, 2005 and listing Amit Patel and Hal Varian as inventors; U.S. patent application Ser. No. 11/026,507 (incorporated herein by reference and referred to as "the '507 application"), titled "GENERATING AND/OR SERVING LOCAL AREA ADVERTISEMENTS, SUCH AS ADVERTISEMENTS FOR DEVICES WITH CALL FUNCTIONALITY", filed on Dec. 30, 2004 and listing Shumeet Baluja and Henry A. Rowley as inventors; U.S. patent application Ser. No. 11/184,053 (incorporated herein by reference and referred to as "the '053 application"), titled "SELECTING AND/OR SCORING CONTENT-RELEVANT ADVERTISEMENTS", filed on Jul. 18, 2005 and listing Darrell Anderson, Alexander Paul Carobus, Giao Nguyen and Narayanan Shivakumar as inventors; and U.S. patent application Ser. No. 11/228,583 (incorporated herein by reference and referred to as "the '583 application"), titled "FLEXIBLE ADVERTISING SYSTEM WHICH ALLOWS ADVERTISERS WITH DIFFERENT VALUE PROPOSITIONS TO EXPRESS SUCH VALUE PROPOSITIONS TO THE ADVERTISING SYSTEM", filed on Sep. 16, 2005, and listing Sumit Agarwal, Gregory Joseph Badros, and John Fu as inventors.

Figure 7:
FIG. 7 illustrates an exemplary data structure for storing ad information in a manner consistent with the present invention.

FIG. 7 illustrates an exemplary data structure 700 for storing ad information in a manner consistent with the present invention. As shown, the data structure 700 may include a plurality of entries corresponding to a plurality of rows. Each entry may include an ad identifier 710, an ad creative 720, targeting information 730, price information 740 and/or performance information 750. The targeting information 730 may include, for example, one or more of keywords, vertical categories, genres, concepts, audio program identifiers, audio server identifiers, user identifiers, user types, locations, times, dates, client devices, other serving constraints, etc. The targeting information 730 may be provided by the advertiser. Alternatively, or in addition, the targeting information 730 may be derived from the ad creative and/or information associated with the ad such as an ad landing page. The price information 740 may be, for example, a price per impression, a maximum price per impression, a price per selection, a maximum price per selection, a price per conversion, a maximum price per conversion, etc. The performance information 750 may be, for example, a selection rate, a call-through rate, a message-through rate, a conversion rate, end user ratings, etc.

§4.3.2 Exemplary Apparatus

Figure 12:
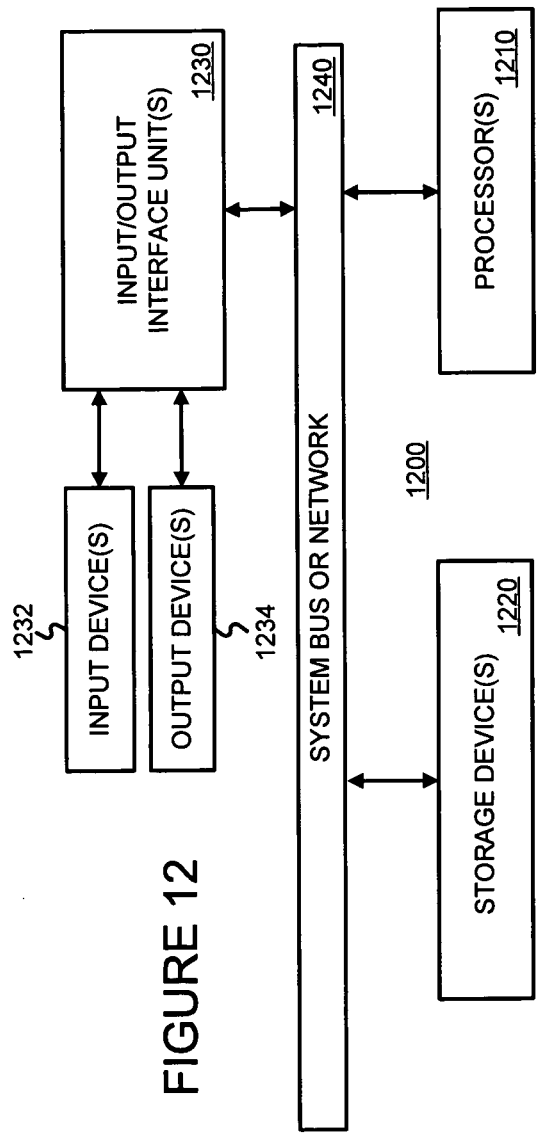
FIG. 12 is a block diagram of apparatus that may be used to perform at least some operations, and store at least some information, in a manner consistent with the present invention.

FIG. 12 is a block diagram of apparatus 1200 that may be used to perform at least some operations, and store at least some information, in a manner consistent with the present invention. The apparatus 1200 basically includes one or more processors 1210, one or more input/output interface units 1230, one or more storage devices 1220, and one or more system buses and/or networks 1240 for facilitating the communication of information among the coupled elements. One or more input devices 1232 and one or more output devices 1234 may be coupled with the one or more input/output interfaces 1230.

The one or more processors 1210 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 1220 and/or may be received from an external source via one or more input interface units 1230.

In one embodiment, the machine 1200 may be one or more conventional personal computers. In this case, the processing units 1210 may be one or more microprocessors. The bus 1240 may include a system bus. The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1232, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1210 through an appropriate interface 1230 coupled to the system bus 1240. The output devices 1234 may include a monitor or other type of display device, which may also be connected to the system bus 1240 via an appropriate interface. In addition to (or instead of) the monitor, the personal computer may include other (peripheral) output devices (not shown), such as speakers and printers for example.

Referring back to FIG. 3, one or more machines 1200 may be used as end user client devices 350, content servers 330, audio content servers 360, telephone service provider facilities 370, search engines 320, e-mail (or v-mail) servers 340, and/or ad servers 310.

§4.3.3 Refinements and Alternatives

Referring back to operations 410 of FIG. 4, relevancy information may be provided by the audio publisher before the audio document is served (e.g., broadcast, multicast, unicast, transferred, etc.). If the audio document has been previously saved (e.g., previously recorded), it can be analyzed before it is served. If the audio document is being served live, the audio document may be analyzed as it is being served (perhaps shortly before it is decoded and played at a client device).

Referring back to operations 420 of FIG. 4, ad spots may be provided, separate from the audio document, by the audio publisher before the audio document is served. Alternatively, or in addition, ad spots may be determined based on information encoded in the audio document (e.g., well before the occurrence of the ad spot, or just before the ad spot). Thus, for example, an audio document may, early on, encode the fact that there are three (3) two-minute ad spots at 20 minutes, 40 minutes and 55 minutes into the document. As another example, an audio document may encode the fact that there is a two-minute ad spot in 10 seconds, 19 minutes and 50 seconds into the document. Such encoding may be in the form of (audible or non-audible) audio tones, text information in audio packets or audio stream packets, executable code (e.g., Javascript) to call an ad server, etc.

Note that since, in some cases, audio documents can be downloaded on demand, the length of the audio document may be varied to accommodate more or less ad spots. For example, if there are a lot of very relevant ads, and/or the advertisers are willing to spend a lot for impressions, more ad spot time may be provided. Thus, a ratio of audio content time-to-ad time may be decreased or increased depending on one or more of (A) a degree of ad relevancy, (B) a revenue benefit of having more ad spots, (C) a decrease in user utility (e.g., user annoyance) at having more ad spots, (D) a level of user demand for the content, (E) an extent of end user funding of the content, etc. Thus, end user utility can be balanced against advertising revenues.

If the audio document has been previously saved (e.g., previously recorded), an arbitration to determine ads to be served in various ad spots may occur before the audio document is served (e.g., broadcast, multicast, unicast, transferred, etc.). If the audio document is being served live, the arbitration may take place as it is being served (perhaps shortly before it is decoded and played at a client device). If the audio document is downloaded (e.g., using some transfer protocol such as FTP), the document may include executable code to initiate an ad arbitration when the audio document is played (e.g., when a play is initiated). In either case, ads may be provided with (e.g., inserted into) the audio document (e.g., a stream carrying the audio content) after the arbitration. If the audio document has been previously saved, all ad spots in the audio document may be arbitrated one time. In this way, ad spots at parts of the audio document in higher demand (e.g., the start of the audio document) may be filled with higher scoring ads.

An audio document may be divided into segments, each including ad spots. In such an embodiment, each segment may be considered to be an audio document itself. Relevant ads may be determined on the basis of a particular audio segment, or both the particular audio segment (e.g., weighted more) and the audio document as a whole (e.g., weighted less).

The ad information may include whether or not the advertiser wants or consents to its ad being served more than one time in a given audio document (instance). For example, an advertiser might specify that its ad is to be served no more than N times with an instance of an audio document (e.g., a unicast audio stream). Alternatively, or in addition, the advertising network and/or the audio document publisher may implement policies which limit the number of times a given advertisement can be served with an instance of an audio document.

Although many of the examples were described in the context of offers (or maximum offers) per impression, embodiments consistent with the present invention may consider other offers such as offers (or maximum offers) per user selection (or call, or messaging, etc.), offers (or maximum offers) per conversion (e.g., telephone call, item purchase, item order, etc.). Similarly, scoring may be a function of one or more offers and perhaps the likelihood of one or more user actions. Although ad scoring may reflect an expected cost per impression (e.g., bid per impression, bid per selection * selection rate or probability, bid per conversion * conversion rate or probability, etc.), other techniques for scoring ads may be used. Such techniques may consider end user utility (e.g., relevance, annoyance factor, etc.) of an ad.

Although some of the embodiments consistent with the present invention described inserting an audio advertisement within an audio document, the advertisement may be in other formats and may be served with an audio document. For example, a text advertisement might be served before, during, or after, an MP3 file is played on an MP3 player with a display screen. As another example, a video or animated advertisement might be played before an MP3 file is played on a multimedia player. Thus, although the format of the ad may match that of the audio document with which it is served, the format of the ad need not match that of the audio document.

Although FIGS. 4 and 10 described determining relevant ads for a given audio document, embodiments consistent with the present invention may be used to determine audio documents (or ad spots thereof) relevant to a given ad. For example, an advertiser may be presented with documents considered to be relevant to its ad. The documents may be ordered using such relevance. The advertiser may elect to try to have its advertisement served with a document or documents (or with an ad spot(s) thereof). The advertiser may express such an election(s) as an offer to have its ad served with the document(s). Other advertisers may do the same. When the audio document is served, contention among ads that are eligible to be served with the audio document may be arbitrated (e.g., using an auction).

Ad-based revenue may be shared between the ad serving network and the audio publisher. The audio publisher may collect money from end users on a subscription basis, on a per download basis, and/or a per rendering basis. Ad revenue shared with the audio publisher may be used to subsidize (e.g., reduce or eliminate) user costs. In fact, ad revenue (e.g., ad network's share and/or audio publisher's share) may be used to pay users to download or render audio documents including ads. For example, if a user normally pays $1.00 to download an MP3 song, the user might be charged less (or nothing, or actually paid) to download the MP3 song with one or more advertisements. Advertising revenues may be used to subsidize other content and/or services such as voice-mail, live chat, ring tones, song downloads, song plays, audio program downloads, audio program plays, telephone services, walkie-talkie services, etc.

Arbitrations in embodiments consistent with the present invention may be performed on a per-broadcast (or per-multicast) basis, or on a per-serve or per-download basis. Performing arbitrations on a per-serve or per-download basis has the potential to generate more revenue. For example, under a per-broadcast agreement on an audio document with 100,000 ad spots, if advertiser A is willing to pay $5.00/impression, with a budget limit of $50,000.00, advertiser B is willing to pay $2.00/impression, with a budget limit of $60,000.00, and advertiser C is willing to pay $1.00/impression, with a budget limit of $100,000.00, ad C would be served 100,000 times, netting $100,000.00. On the other hand, under a per ad spot arbitration, ad A would be served 10,000 times, ad B would be served 30,000 times and ad C would be served 60,000 times, netting $170,000.00 ($50,000.00+$60,000.00+$60,000.00).

§4.4 Examples of Operations

§4.4.1 First Example

Per Audio Stream Offers, Real Time Arbitration, and Ad Network Hosted Audio Document Serving An advertiser may log into a system consistent with the present invention and enter targeting information (e.g., language, term(s), category, country of user, etc.). (Recall, e.g., 455 of FIG. 4.) In response, the advertiser may be shown a list of audio streams that match their criteria. The list may be presented to the advertiser in an order based on a degree of relevance. The advertiser may then enter a maximum cost-per-download offer on one or more of the audio streams.

The advertising network may host the serving of audio streams participating in the advertising network. When a user downloads an audio stream, an arbitration may be run at the time of the download to determine which ads to serve with (e.g., insert into) the audio stream. In this simple example, the arbitration might simply compare the maximum cost-per-download offers of all ads that bid on the audio stream to determine one or more winning ads.

The winning (e.g., audio) ads are served with (e.g., inserted into) the audio stream at the right spots (e.g., specified by the audio publisher) and delivered to the user. For example, the audio publisher could specify ad spots in the beginning of the stream, 10 minutes into the stream, 20 minutes into the stream, and so on.

The advertiser may be provided with (e.g., real-time) reports on the number of ad serves and other related statistics (e.g., country from where download request came, etc.).

§4.4.2 Second Example

Per Audio Stream Offers with Pre-Streaming Arbitration and Ad Insertion

If the advertising network will not host the serving of the audio document, it may be more challenging to run a real-time arbitration. One solution would be to avoid the real-time arbitration altogether. For example, an auction could end (e.g., at a fixed time) before the audio stream starts. This is particularly useful for audio streams broadcast at set times (rather than those downloaded on demand, although it may be useful if the arbitration is performed after a user request, but prior to a streaming). That is, an online auction could be held in which advertisers bid on an audio program. Consequently, instead of a real-time arbitration, there could be an online auction which ends before the audio stream starts. It this way, ads to be served with the audio stream will be known before the start time. Such an exemplary embodiment consistent with the present invention is more useful where an aggregation of streams is to be bid on (e.g., an audio document broadcast) since it might not be efficient for advertisers to bid on a per-audio document instance (e.g., per unicast audio stream) basis.

§4.4.3 Third Example

Per Tradeting Criteria Offers

In the previous two examples, advertisers targeted particular audio document by associating offers with such audio documents. Unfortunately, however, this may become inconvenient when the number of audio documents increases and advertisers mainly care about serving their ads with relevant audio documents (and to relevant users), without regard to the particular audio document with which the ad is served.

Assume that an audio document is a weekly Pregame Show (e.g., as a radio broadcast, a television broadcast, a cable broadcast, an Internet broadcast, an Internet multicast or unicast, a digital video recorder replay, etc.) for the Oakland Raiders NFL football team that is generated during the NFL football season. Assume that the audio publisher has provided the following relevancy information for its weekly show:
    topics=football; Raiders
    keywords=Raiders; Oakland Raiders
Assume further that for a given show previewing a game in which the Oakland Raiders will face the St. Louis Rams, the following relevancy information is extracted and/or generated from the audio document:
    topics=football; Raiders
    keywords=game; St. Louis Rams; Randy Moss; Kerry Collins; injuries; defense; offense; score; special teams; Oakland Raiders; football; Marc Bulger; NFL . . . .
Finally, assume that the following relevancy information is determined:
    client device location=Oakland;
    client device type=laptop; video supported; flash animation supported.
For a 30 second ad spot 10 minutes into an audio document, the following ads are relevant (matching targeting information is underlined):
    AD A: OAKLAND AUTO MALL
    keywords and geotargeting: Oakland; cars; autos; automobiles; lease; new cars; used cars
    offer: $70.00 per 1000 impressions
    length: 30 seconds
    AD B: NFL JERSEYS
    keywords: NFL; football; jerseys
    topics: football; apparel; team apparel;
    offer: $55.00 per 1000 impressions length: 15 seconds
AD C: TONY'S PIZZA
keywords and geotargeting: pizza; Oakland; game;
delivery offer: $35.00 per 1000 impressions
length: 15 seconds
AD D: GAME FACE SPORTS FAN SUPPLIES
keywords: football; NFL; baseball; MLB; basketball; NBA; fan; fanatic
offer: $30 per 1000 impressions
length 15 seconds The following ad or combination of ads could be served in the 30 second ad spot: A; BC; BD; and CD. Serving ad A alone would generate $0.070, serving ads B and C would generate $0.090, serving ads B and D would generate $0.085, and serving ads C and D would generate $0.065. If the ads (or combinations of ads) are scored based on their revenue, the serving scenarios would be ordered: BC; BD; A; and CD. Thus, ads B and C would be served in the 30 second ad spot under the foregoing example.

Recognizing that some devices that can play audio documents can actually play enhanced advertisements including video or animation for example, suppose that ad D had an additional offer of $100 per 1000 impressions for audio/video impressions. Since the client device in this case supports video, serving ad A alone would generate $0.070, serving ads B and C would generate $0.090, serving ads B and D would generate $0.155, and serving ads C and D would generate $0.135. Thus, in this scenario, if the ads (or combinations of ads) are scored based on their revenue, the serving scenarios would be ordered: BD; CD; BC; and A. Therefore, ads B and D would be served in the 30 second ad spot under the foregoing example.

As this third example illustrates, allowing advertisers to target based on keywords or topics, rather than targeting their ads to a particular audio document, allows advertisers to have their ads placed on various audio documents without having to specify each such document. Thus, ad A would also be relevant to an audio document concerning cars, ad D would also be relevant to an audio document concerning the NBA, ads A and C would also be relevant to an audio document concerning Oakland, etc.

§4.4.4 Fourth Example

Voicemail

Voicemail is available on telephone systems and is being integrated to e-mail services such as GMail from Google for example. Speech recognition may be used to transcribe voicemail to extract and/or generate relevancy information. This relevancy information may be used to determine relevant ads, at least some of which may be rendered with a voice mail message or rendered with an e-mail. Thus, for example, ads may be rendered with an e-mail that includes an audio attachment.

§4.4.5 Fifth Example

Audio Links in Web Pages

Documents, such as Web pages for example, may include audio and/or video links. Relevancy information may be extracted (e.g., from close-captioned information) and/or generated using speech recognition. This relevancy information may be used, perhaps in addition to other relevancy information of the Web page, to determine relevant ads, at least some of which may be rendered with the document. Such rendering might be conditioned upon the audio and/or video link being selected by a user.

§4.4.6 Sixth Example

Webcasts and Podcasts

Webcasts and podcasts may be played on media players such as Mediaplayer from Microsoft and Realplayer from RealNetworks. Rather than simply showing pre-selected ads (which might not be relevant to the content of the Webcast and/or which might not reflect the desire of competing advertisers to have their ad played), speech recognition may be used to extract and/or determine relevance information from the audio stream. Such relevance information may be used to determine relevant ads, at least some of which may be rendered with the Webcast or podcast. Depending on the type of the ads chosen, video/audio ads can be appended, prepended, or inserted into the video/audio stream, text or graphic ads can be rendered on an ancillary display or a browser window, etc.

§4.4.7 Seventh Example

Voice Messenger Chat

Voice chatting is provided in various messaging software. Speech recognition may be used to extract and/or determine relevance information from the audio documents. Such relevance information may be used to determine relevant ads, at least some of which may be rendered with the chat (e.g., along side every live conversation). For example, if two people are chatting about IPod, speech recognition can be used to extract the topic or keyword IPod and ads relevant to IPod can be inserted into the chat.

§4.4.8 Eight Example

Video Search

Advertising systems, such as AdWords from Google for example, may serve ads with a search results page, where the ads are relevant to a search query that prompted the search results page. The search engine may use indexed Web page information. Rather than searching Web pages, video files can be searched. Ads relevant to the search query may be served in association with the search results. Information extracted from the video (linked from the search results page) may also be used to determine relevant ads and/or to improve search results.

§4.5 CONCLUSIONS

As can be appreciated from the foregoing, embodiments consistent with the present invention can be used to deliver relevant advertisements for audio-rich media such as, for example, radio, television, voicemail, Webcast, podcast, online voice chatting, telephone conversations, etc. Embodiments consistent with the present invention support arbitrations allowing more advertisers to compete for ad spots on audio documents. This increased competition should increase advertising revenues for audio document publishers.

What is claimed is:
1. A computer-implemented method comprising:
 a) accepting, with an advertising system including at least one computer, information defining at least one ad spot associated with at least one instance of an audio document;
 b) accepting, with the advertising system, offers to have advertisements served in the at least one ad spot;

c) arbitrating, with the advertising system, among competing advertisements, using at least the offers, to determine at least one advertisement to be served in that at least one ad spot;

d) transmitting, with the advertising system, the audio document for delivery to an end user client device; and e) transmitting, with the advertising system, the at least one advertisement to be served in that at least one ad spot, for delivery to the end user client device, wherein the act of arbitrating occurs after the act of transmitting the audio document has been initiated.

2. The computer-implemented method of claim 1 wherein the audio document is a radio program.

3. The computer-implemented method of claim 1 wherein the audio document includes a live Dr recorded musical work with lyrics.

4. The computer-implemented method of claim 1 wherein the audio document includes a live or recorded dramatic work with dialog or a monolog.

5. The computer-implemented method of claim 1 wherein the audio document includes a live or recorded talk show.

6. The computer-implemented method of claim 1 wherein the audio document includes a voice mail.

7. The computer-implemented method of claim 1 wherein the audio document is a segment of an audio conversation.

8. The computer-implemented method of claim 1 wherein the act of transmitting the audio document includes transmitting, using the Internet protocol, the audio document to the end user device via one or more communications networks.

9. The computer-implemented method of claim 1, wherein the act of arbitrating occurs after the act of transmitting the audio document has been completed and a play operation has been initiated on the audio document.

10. The computer-implemented method of claim 1 wherein the offer is one of (A) a price per impression, and (B) a maximum price per impression.

11. The computer-implemented method of claim 1 further comprising:

d) determining advertisements relevant to the audio document using serving constraints associated with the advertisements and relevance information associated with the document, wherein the acts of accepting offers and arbitrating occur solely with respect to advertisements determined to be relevant to the document.

12. A computer-implemented method comprising:

a) receiving, with an advertising system including at least one computer, relevance information for an advertisement;

b) determining, with the advertising system, at least one audio document using the received relevance information;

c) generating, with the advertising system, information about the at least one audio document for presentation to an advertiser associated with the advertisement; and d) receiving, with the advertising system, from the advertiser, an offer to have its advertisement served with the at least one audio document accepted by the advertiser.

13. The computer-implemented method of claim 12 further comprising:

e) determining, with the advertising system, a score for the advertisement using at least the offer; and f) determining, with the advertising system, for one of the at least one audio document, whether or not to serve the advertisement of the advertiser using the score.

14. The computer-implemented method of claim 12 wherein the audio document is a radio procram.

15. The computer-implemented method of claim 12 wherein the audio document includes a live or recorded musical work with lyrics.

16. The computer-implemented method of claim 12 wherein the audio document includes a live or recorded dramatic work with dialog or a monolog.

17. The computer-implemented method of claim 12 wherein the audio document includes a live or recorded talk show.

18. The computer-implemented method of claim 12 wherein the audio document includes a voice mail.

19. The computer-implemented method of claim 12 wherein the audio document is a segment of an audio conversation.

20. The computer-implemented method of claim 12, further comprising:

transmitting, by the advertising system, the one or more advertisements to be served with the at least one audio document, using the Internet protocol, to an end user device via one or more communications networks.

21. The computer-implemented method of claim 12 wherein the offer is one of (A) a price per impression, and (B) a maximum price per impression.

22. The computer-implemented method of claim 12 wherein the relevance information accepted was provided by the advertiser.

23. The computer-implemented method of claim 22 wherein the relevance information includes at least one keyword provided as a serving constraint.

24. The computer-implemented method of claim 22 wherein the relevance information includes at least one topic.

25. The computer-implemented method of claim 12 wherein the relevance information received was determined by analyzing information associated with the advertisement.

26. The computer-implemented method of claim 25 wherein the relevance information includes at least one keyword.

27. The computer-implemented method of claim 25 wherein the relevance information includes at least one topic.

28. Apparatus comprising:

a) at least one processor;

b) an input device; and c) at least one storage device storing a computer executable code which, when executed by the at least one processor, performs a method of 1) accepting information defining at least one ad spot associated with at least one instance of an audio document, 2) accepting offers to have advertisements served in the at least one ad spot, 3) arbitrating among competing advertisements, using at least the offers, to determine at least one advertisement to be served in that at least one ad spot, 4) transmitting the audio document for delivery to an end user client device, and 5) transmitting the at least one advertisement to be served in that at least one ad spot, for delivery to the end user client device, wherein the act of arbitrating occurs after the act of transmitting the audio document has been initiated.

29. Apparatus comprising:

a) at least one processor;

b) an input device; and c) at least one storage device storing a computer executable code which, when executed by the at least one processor, performs a method of 1) receiving relevance information for an advertisement, 2) determining at least one audio document using the accepted relevance information, 3) generating information about the at least one audio document for presentation to an advertiser associated with the advertisement, and 4) receiving, from the advertiser, an offer to have its advertisement served with the at least one audio document accepted by the advertiser.

30. A computer-implemented method comprising:

a) accepting, with an advertising system including at least one computer, relevance information for an audio document;

b) determining, with the advertising system, a plurality of advertisements relevant to the audio document using the relevance information and serving constraints of the advertisements;

c) selecting, with the advertising system, at least one of the determined relevant advertisements to be served with the audio document;

d) transmitting, with the advertising system, the audio document for delivery to an end user client device; and e) transmitting, with the advertising system, the selected at least one of the determined relevant advertisements for delivery to the end user client device, wherein the act of selecting occurs after the act of transmitting the audio document has been completed and a play operation has been initiated on the audio document.

31. The computer-implemented method of claim 30, wherein the act of selecting includes:

i) accepting offers to have advertisements served in the at least one ad spot, and ii) arbitrating among competing advertisements, using at least the offers, to select at least one advertisement to be served in that at least one ad spot.

32. The computer-implemented method of claim 30, wherein the audio document is or includes at least one of (A) a radio program, (B) a live or recorded musical work with lyrics, (C) a live or recorded dramatic work with dialog or a monolog, (D) a live or recorded talk show, (E) a voice mail, and (F') a segment of an audio conversation.

33. The computer-implemented method of claim 30, wherein the audio document is transmitted, using the Internet protocol, to an end user device via one or more communications networks.

34. Apparatus comprising:

a) at least one processor;

b) an input device; and c) at least one storage device storing a computer executable code which, when executed by the at least one processor, performs a method of 1) accepting relevance information for an audio document, 2) determining a plurality of advertisements relevant to the audio document using the relevance information and serving constraints of the advertisements, 3) selecting at least one of the determined relevant advertisements to be served with, the audio document, 4) transmitting the audio document for celivery to an end user client device, and 5) transmitting the selected at least one of the determined relevant advertisements for delivery to the end user client device, wherein the act of selecting occurs after the act of transmitting the audio document has been completed and a play operation has been initiated on the audio document.

* * * * *